United States Patent [19]

St. Louis

[11] Patent Number: 4,593,441
[45] Date of Patent: Jun. 10, 1986

[54] RETAINER CLIP

[75] Inventor: Robert M. St. Louis, St. Leonard, Canada

[73] Assignee: Camco Inc., Mississauga, Canada

[21] Appl. No.: 729,045

[22] Filed: Apr. 30, 1985

[30] Foreign Application Priority Data

Dec. 7, 1984 [CA] Canada ................................. 469641

[51] Int. Cl.4 ............................................. A44B 21/00
[52] U.S. Cl. ...................................... 24/297; 24/295; 24/563; 52/521
[58] Field of Search ................. 24/293, 295, 297, 563, 24/573; 312/140; 52/521

[56] References Cited

U.S. PATENT DOCUMENTS

| 1,330,968 | 2/1920 | Woods | 24/563 |
| 2,305,122 | 12/1942 | Wiley | 24/295 |
| 2,938,252 | 5/1960 | Scheemaeker | 24/563 |
| 3,187,855 | 6/1965 | Ridder | 52/521 |
| 3,348,272 | 10/1967 | Germani | 24/563 |
| 4,356,601 | 11/1982 | Kimura | 24/297 |
| 4,480,360 | 11/1984 | Brugman et al. | 24/295 |

FOREIGN PATENT DOCUMENTS

| 875998 | 7/1971 | Canada. | |
| 1942314 | 3/1971 | Fed. Rep. of Germany | 24/297 |
| 840556 | 7/1960 | United Kingdom | 24/295 |
| 963748 | 7/1964 | United Kingdom | 24/295 |

Primary Examiner—Victor N. Sakran
Attorney, Agent, or Firm—Raymond A. Eckersley

[57] ABSTRACT

A one piece substantially W-shaped plastic clip has a pair of outer legs that are flexible and can move in a first direction toward an intermediate member that in turn is movable in a direction substantially perpendicular to the first direction of movement above described. Each leg has a notch on its side remote from the intermediate member and the intermediate member has a catch projecting from a side facing perpendicular to the first direction. The notches mount the clip to a first panel and the catch is adapted to cooperate with a second panel member to retain same in position.

16 Claims, 6 Drawing Figures

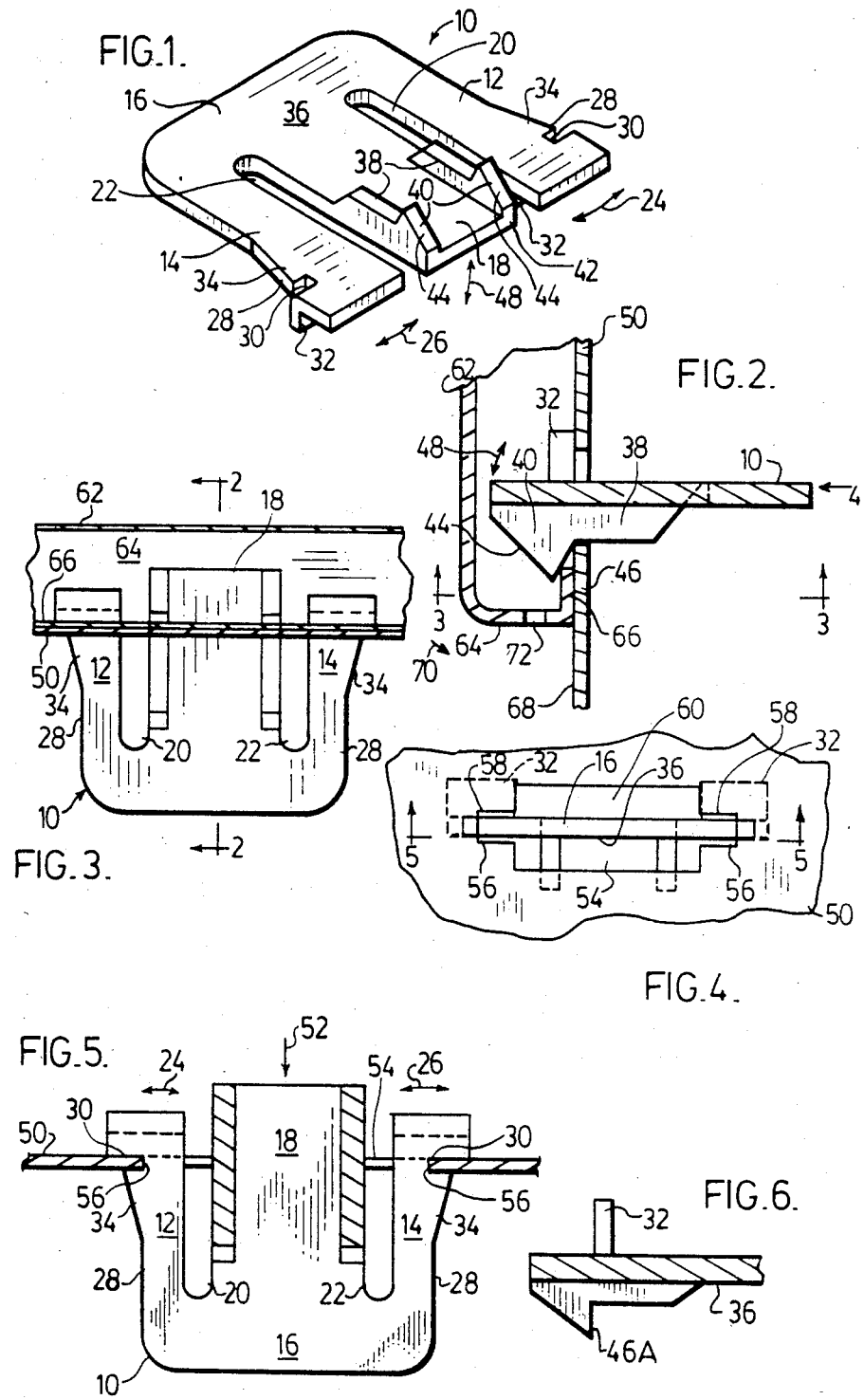

RETAINER CLIP

FIELD OF THE INVENTION

The present invention relates to a retainer clip, more particularly the present invention relates to a resilient one piece clip having mounting legs positioned on opposite sides of an intermediate member that resiliently supports a catch.

BACKGROUND TO THE INVENTION

There are a multitude of different clips adapted for mounting or holding elements together. In the appliance business such clips may take the form of spring clips resiliently holding the panels in position and in some cases socket type clips are used, for example to mount an access panel or covering panel in position while facilitating removal.

Plastic clips have been used for a variety of other different purposes in the manufacture of furniture and the like for example, Canadian Pat. No. 875,998, issued July 20, 1971 to Fisher, discloses a special type of plastic clip to be used in conjunction with further hardware for securing a pair of mutually perpendicular panels together. This particular clip has a planar base member with a pair of prongs extending substantially perpendicular thereto and adapted to mount the clip on a first panel. A shank portion extends from the base through a hole in the first panel and is provided with a connecting means adapted to cooperate with an arm extending from a second panel. This device cannot be used to secure a pair of substantially face to face panels together.

BRIEF DESCRIPTION OF THE PRESENT INVENTION

The present invention relates to a resilient clip for securing a pair of panels in position relative to each other.

Broadly, the present invention relates to a one-piece substantially planar and W-shaped resilient plastic clip formed by a pair of laterally spaced outside legs interconnected at one end by a bridging member, an intermediate member extends from said bridging member between said legs while providing a free space between each of said legs and said intermediate member, each of said legs being resiliently flexible to permit movement into the adjacent space between said leg and said intermediate member and terminating in a free end, a groove formed adjacent the free end of each of said legs on the side of each leg remote from the intermediate member, said grooves being positioned to receive edges of a hole in a panel member to retain said clip in position on said panel member, said clip being constructed so that said intermediate member is resiliently flexible in a direction substantially perpendicular to the direction of movement of said leg members into their respective adjacent spaces and a catch means projecting from a face of said intermediate member facing in a direction substantially perpendicular to the direction of movement of said legs into their respective adjacent space.

Preferably each of the leg members will be relatively long and narrow to facilitate flexing whereas the intermediate member will be significantly wider than the leg members and the thickness of the clip, so that the intermediate member is more flexible in a direction substantially perpendicular to the thickness of the clip.

It is preferred that the catch means be provided adjacent the free end of the intermediate member and that in particular the catch means be divided into a pair of catches, one located adjacent each lateral edge of the intermediate member.

It will be apparent that the hole in the panel that is adapted to mount the clip will be such that the legs snap into position to force the edge of the panel into the grooves formed in the legs and that the main portion of the aperture or hole will be sufficiently wide to permit flexing of the intermediate member in said direction substantially perpendicular to the direction of movement of the legs towards each other in the mounting operation.

Each leg will extend through the hole in the first panel as will the intermediate member so that the bridging section will be on one side of the first panel and the free ends of the legs and the catch will be on the opposite side of the first panel.

BRIEF DESCRIPTION OF THE DRAWINGS

Further features, objects and advantages will be evident from the following detailed description of the preferred embodiments of the present invention taken in conjunction with the accompanying drawings in which:

FIG. 1 is an isometric view of a clip incorporating the present invention;

FIG. 2 is a section through the centre of a clip incorporating the present invention mounted in position securing a pair of panels together and shows a section along the lines 2—2 of FIG. 3;

FIG. 3 is a section along the lines 3—3 of FIG. 2;

FIG. 4 is an end view looking in the direction of the arrow 4 in FIG. 2;

FIG. 5 is a section along the lines 5—5 of FIG. 4 illustrating the grooves on the legs of the clip and their cooperation with the panel to which the clip is being mounted;

FIG. 6 is a partial view similar to FIG. 2 showing a portion of the clip only with the catch in the form of a latch rather than a detent.

DESCRIPTION OF THE PREFERRED EMBODIMENTS

As shown in FIG. 1 clip 10 is composed of a substantially planar member having a pair of elongated outside leg members 12 and 14 interconnected by a bridging section generally indicated at 16 and having an intermediate section 18 projecting therebetween.

It will be noted that there are spaces 20 and 22 formed between the leg members 12 and 14 respectively and the intermediate member 18. These spaces 20 and 22 permit the leg members 12 and 14 to resiliently flex as indicated by the arrows 24 and 26 toward and away (substantially in the plane of the member 10) from the intermediate section 18.

Each of the legs is provided on its outside edge 28 with a notch or groove 30 adapted to receive a panel as will be described further hereinbelow to mount the clip in position. Immediately in front of, and projecting as an extension of the wall of each groove or notch 30 at the side of each notch 30 remote from the bridging member 16, is a wall member 32. These wall members 32 extend substantially perpendicular to the leg members from the same side of the clip and are adapted to bear against one face of the panel when the clip is in position and prevent tilting, i.e., to hold the clip in a position substantially perpendicular to the panel. Each leg member is also provided with a lateral outward extension 31 projecting as an extension of the outer wall of the grooves or notches 30.

The length of the leg 12 or 14 between the notch 30 and the bridging section 16 is sufficiently long to permit relatively easy flexing of the leg when the clip 10 is being mounted. To facilitate mounting, the outside 28 of each of the legs immediately adjacent the notch 30 on the side of the notch closest to the bridging section 16 is a sloped or tapered section extending laterally from the leg in the direction of the free end and generally indicated at 34 which functions as a cam during the mounting operation as will be described in detail hereinbelow.

The intermediate section 18 has a substantially rectangular cross section with two main planar surfaces substantially coinciding with the two planar surfaces defining the clip 10. One of these surfaces generally indicated at 36 is provided with a pair of upstanding ridges, both of which are identical and thus have been indicated by the same reference numeral 38. The critical part of each of these ridges is the catch 40 located adjacent the free end 42 of the intermediate member 18. These catches 40 as shown in more detail in FIG. 2 are substantially triangular in shape and have their outer surfaces or edges 44 sloping toward the bridging section 16 and away from the surface 36 and have an inner surface 46 which in the embodiment of FIG. 2 slopes at an angle toward the surface 36 and the bridging section 16 with the angle between this surface 46 and the surface 36 being steeper than the angle of the surface 44 to surface 36. In the embodiment of FIG. 6 the surface 46A is substantially perpendicular to the surface 36 to provide a latch in place of the detent as shown in FIG. 2.

The remainder of the raised portion 38 has no specific function other than it reinforces the intermediate member 18. It will be noted that the raised portions 38 extend from the opposite face of the clip 10 relative to the walls 32.

It will be apparent that the intermediate member 18 measured laterally, i.e., in the plane of the clip 10, is wider than the thickness of the intermediate member 18 whereby the intermediate member 18 may be flexed in a direction substantially perpendicular to the direction of flexure of the legs 12 and 14, i.e., perpendicular to the arrows 24 and 26 as indicated by the arrow 48.

The clip 10 is utilized as follows: First it is forced into position on a panel such as the panel 50 by movement in a direction substantially parallel to the direction of the arrow 52 (see FIG. 5) into an aperture 54 formed in the panel 50 to force the camming elements 34 of the legs 12 and 14 into engagement with the edges of the aperture 54 (in this case against the end edge 56 of the two narrow lateral extensions 58 of the aperture 56) until the edges of the panel 50 align with the notches 30 so that portions of the panel 50 on the outside of the extensions 58 are received within the notches 30.

It will be noted that the aperture 54 in the main portion thereof is substantially rectangular with the extensions 58 projecting from opposite sides thereof substantially adjacent the axial centre line of the aperture (see FIG. 4). It will also be noted that the dimensions of the aperture in a direction substantially perpendicular to its axial centre line are sufficient so that the projections 38 pass through the aperture and sufficient clearance is provided on the side of the intermediate member 18 remote from the extensions 38 to permit flexure of the intermediate member 18 for operation of the clip, i.e, into the space generally indicated at 60 in FIG. 4.

With the clip 10 mounted in position in the panel 50 as above described it may be used to hold a panel such as the panel 62 shown in FIGS. 2 and 3 in position, i.e., one end of the panel may be easily fixed by means of a clip or a series of clips arranged along one edge of the panel 62.

As indicated, the panel 62 has a substantially-U-shaped end portion having a bridging section 64 and a small upstanding flange section 66. This flange section 66 is held between the catch 40 and the outer surface 68 of the panel 50 in the manner shown in FIG. 2, i.e., between the inner wall 46 of the catch 40 and the outer face 68 of the panel 50.

The surface 44 functions to cam the intermediate section 18 out of the way when the panel 62 is moved into position if it is moved into position by a pivoting action or movement substantially in the direction of the arrow 70 in FIG. 2. Such movement causes the free edge of the flange 66 to engage the surface 44 and tend to move the intermediate section 18 in the direction of the arrow 48 as above described. The opposite end of the panel 62 may be held by similar clips or by any other suitable means.

If the catch of FIG. 6 is used in place of the one illustrated in FIG. 2, it will be apparent that movement of the panel in the opposite direction to the arrow 70 in FIG. 2 will be firmly resisted because of the angle of the face 46 being substantially perpendicular to the direction of movement. In this case it may be necessary to insert a tool through the aperture 72 provided in the bridging section 64 of the panel 62 to force the intermediate section 18 of the clip 20 in the direction of the arrow 48 and release the flange 66, i.e., move the tip of the latch 40 beyond the free edge of the flange 66 so that the panel may then be removed.

Having described the invention, modifications will be evident to those skilled in the art without departing from the spirit of the invention as defined in the appended claims.

What I claim as new and desire to secure by Letter Patent of the United States is:

1. A one piece substantially planar substantially W-shaped resilient plastic clip having a pair of opposite faces and formed by a pair of laterally spaced outside legs interconnected at one end by a bridging section and having an intermediate member extending from the bridging section between said leg members while providing a free space between each of said leg members and said intermediate member, notches on the side of each of said leg members remote from said intermediate member, said notches being provided adjacent the free end of said legs, each of said leg members being resiliently flexible for movement into its adjacent said space to permit said notches to snap into position wherein said notch moves over an edge of a panel on which said clip is to be mounted and receives a portion of said panel in said notch, said intermediate member being provided with a catch means extending from one of said opposite faces of said substantially planar clip adjacent the end of said intermediate member remote from said bridging section, said intermedate member being resiliently flexible for movement in a driection substantially perpendicular to the direction of movement of said leg members to permit movement of said catch means into and out of a catching position.

2. A clip as defined in claim 1 wherein said notches in said legs are adapted to receive portions of a panel to which the clip is to be mounted.

3. A clip as defined in claim 2 wherein each of said legs are extended laterally at the side of said notch remote from said bridging section and wherein said legs have a camming section projecting laterally therefrom on the outside surface thereof immediately adjacent the side of the notches adjacent said bridging section.

4. A clip as defined in claim 3 further comprising a retaining wall projecting from each of said leg members along the side of said notches remote from said bridging section, said walls being extensions of the side of each said notch remote from said bridging section, said walls extending substantially perpendicular from the other of said opposite faces of said clip.

5. A clip as defined in claim 4 wherein said catch means has an operative face spaced from said bridging section substantially the same distance as said walls of said notches remote from said bridging section.

6. A clip member as defined in claim 3 wherein said catch means on said intermediate member comprises a pair of spaced catch members located along each lateral edge of said intermediate member.

7. A clip as defined in claim 6 wherein each of said catch members comprises an outside camming edge extending at an angle to said one surface sloping away from said one surface from the free end of the intermediate member toward said bridging section.

8. A clip as defined in claim 6 wherein said catch means has an operative face spaced from said bridging section substantially the same distance as said walls of said notches remote from said bridging section.

9. A clip as defined in claim 7 wherein said catch members on said intermediate member comprises detents.

10. A clip as defined in claim 7 wherein said catch members on said intermediate member comprises latches.

11. A clip as defined in claim 10 wherein said catch means has an operative face spaced from said bridging section substantially the same distance as said walls of said notches remote from said bridging section.

12. A clip as defined in claim 11 wherein each of said catch members comprises an outside camming edge extending at an angle to said one surface sloping away from said one surface from the free end of the intermediate member toward said bridging section.

13. A clip member as defined in claim 1 wherein said catch means on said intermediate member comprises a pair of spaced catch members located along each lateral edge of said intermediate member.

14. A clip as defined in claim 13 wherein said catch members on said intermediate member comprises detents.

15. A clip as defined in claim 13 wherein said catch members on said intermediate member comprises latches.

16. A clip as defined in claim 1 wherein said catch means has an operative face spaced from said bridging section substantially the same distance as said walls of said notches remote from said bridging section.

* * * * *